Aug. 26, 1952     L. W. POLLOCK     2,608,478
PRODUCTION OF FUEL GAS BY CRACKING PROPANE
Filed Feb. 1, 1946
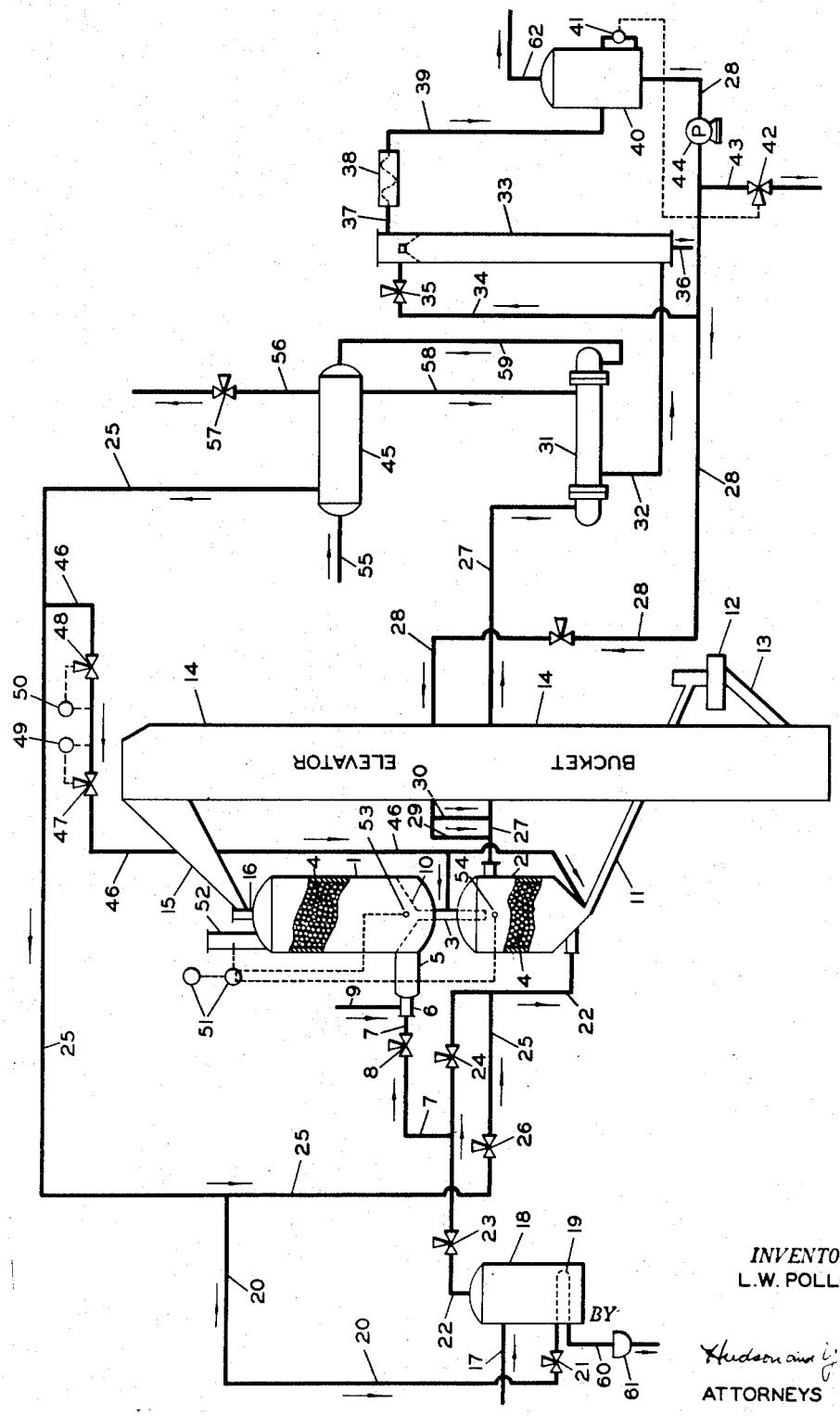
INVENTOR.
L.W. POLLOCK
Hudson and Young
ATTORNEYS Patented Aug. 26, 1952

2,608,478

UNITED STATES PATENT OFFICE 2,608,478

PRODUCTION OF FUEL GAS BY CRACKING PROPANE

Lyle W. Pollock, Medford, Oreg., assignor to Phillips Petroleum Company, a corporation of Delaware Application February 1, 1946, Serial No. 644,949

6 Claims. (Cl. 48—196)

1

This invention relates to processes of cracking light hydrocarbon gases rich in propane in pebble heater type apparatus wherein heat required for heating the gas to cracking temperature and for the heat of reaction is supplied by hot pebbles or elements which are continuously passed thru the cracking chamber. In one particular embodiment it relates to an improved process for cracking propane or propane-rich gases at high temperatures whereby the heat for the reaction is supplied by hot pebbles, and carbon deposited on the pebbles and on the reactor walls during the cracking reaction is simultaneously removed by the water gas reaction. In another embodiment, this invention relates to the thermal cracking of light hydrocarbon gases, predominantly propane, at high temperatures to produce a relatively low specific gravity gas suitable for mixing with base gas of domestic gas systems.

My invention further relates to specific procedures which will be hereinafter described and more particularly pointed out in the appended claims.

In thermally cracking propane-rich gases it is conventional to contact the feed gases with hot refractory checker work or flue walls and also to contact the gases with solid incandescent fuel. In such procedures carbon resulting from the cracking reaction is deposited on the refractory material in the cracking zone or on the flue walls and it is necessary to alternate the cracking step with a burning step to remove the carbon from within the reactor. Of course this results in lower efficiency and poor economy and its avoidance is to be desired.

It is found that by heating pebbles of ceramic, metal, or other refractory material to high temperatures in a heating zone and flowing a stream of the hot pebbles thru the cracking zone in contact with the gas to be cracked a large part of the carbon formed is deposited on the pebbles and can conveniently be removed (burned off) in the pebble heating zone with concomitant heating of the pebbles and without interruption of the cracking process.

In a preferred method of operation it is found that a substantial portion of the carbon normally deposited in the cracking zone during the cracking of propane can be removed by the introduction of steam into the reaction zone along with the propane feed. This mode of operation not only removes carbon from the pebbles and reactor walls but, thru the water-gas reaction, adds valuable fuel to the product gases and simultaneously lowers the B. t. u. value thereof to a

2 range suitable for ordinary domestic gas systems.

In conventional cracking of propane insufficiently high temperatures are used to produce a gas of sufficiently low heating value to be used in established domestic gas systems. Such commercial gas systems usually require a gas having a heating value of between about 500 and 700 B. t. u. per cu. ft. and a relatively low specific gravity, such as below about 0.5 as compared to a value of 1.0 for air. As far as is known, conventional propane cracking procedures result in a product gas having a B. t. u. value per cubic foot of at least about 775 and a specific gravity of at least about 0.386 (air=1). In order to produce a low specific gravity gas of the required B. t. u. rating, it is necessary to operate at sufficiently high temperatures to thoroughly crack the primary decomposition products.

One of the principal objects of this invention is to devise a method for producing a gas suitable for mixing with or supplementing a domestic gas system supply by cracking propane-rich gases.

It is another object of this invention to provide a process for cracking propane to produce a gas of the desired heating value and specific gravity without substantial loss to carbon and tars.

A further object of my invention is to provide a process for cracking propane entailing fast heating, short contact time, and relatively small space requirements.

Further objects and applications of the present invention will become apparent in the accompanying description.

It is found that propane can be thermally cracked to produce a gas having a specific gravity as low as 0.35 and having a gross heating value of 710 B. t. u./ft.$^3$ using cracking temperatures in the neighborhood of 2000° F. and pebble temperatures of about 2250° F. This product gas is then diluted with air (about 20%) to produce a gas having a specific gravity of about 0.48 and a heating value of about 570 B. t. u./ft.$^3$, which is in the range of both variables of a gas suitable for use in supplementing commercial domestic gas supplies.

The above process is performed according to the invention in a pebble heater type apparatus. The carbon formation is about 25% by weight of the feed and is burned off the pebbles in the pebble heater. Oxidation of the carbon must be carefully regulated to maintain temperatures which will not fuse the pebbles. This can be done by regulating the amount of oxygen (air) admitted to the combustion zone or pebble heating zone by known methods.

In a preferred embodiment of the invention, steam is admitted with the propane feed in such quantities that carbon produced by the cracking operation is converted to CO and $CO_2$ by the well-known water gas reaction. By passing steam over carbon at various temperature levels, the following reactions take place:

(1) $\quad C + H_2O \longleftrightarrow CO + H_2$
(2) $\quad C + 2H_2O \longleftrightarrow CO_2 + 2H_2$
(3) $\quad CO + H_2O \longleftrightarrow CO_2 + H_2$
(4) $\quad CO_2 + C \longleftrightarrow 2CO$ Where steam is present during thermal cracking of propane, the above reactions are important along with reactions of hydrocarbons and steam. The reactions of methane and steam may be represented as follows:

(5) $\quad CH_4 + H_2O \longleftrightarrow CO + 3H_2$
(6) $\quad CH_4 + 2H_2O \longleftrightarrow CO_2 + 4H_2$ The velocity of reaction (1) is so slow below 1650° F. as to be practically non-existent but is relatively rapid at temperatures of 1650° F. and above. The velocity of reaction (2) is rapid as compared to reaction (1) up to 1650° F. but above this temperature the reaction rates of (1) and (2) are about equal. The velocity of reaction (4) is more than twice that of reaction (1) at temperatures above 1650° F.

In cracking propane in the presence of a small excess of steam at temperatures of 1650° to 2200° F. and reaction times varying only slightly from 0.7 seconds, reactions (1) and (2) proceed sufficiently to convert most of the free carbon to CO and $CO_2$; reactions (5) and (6) do not proceed a significant amount; and the proportions of CO and $CO_2$ satisfy the equilibrium constant for reaction (3).

While temperatures of about 1650° to 2200° F. in the cracking zone are required in the process of this invention, the preferred range of temperature in which the process operates most efficiently is from about 1900° to 2100° F. and specifically at about 2000° F. for the best results.

When operating at a temperature of 2000° F. in the cracking chamber, a gas temperature entering the heating zone of 2700° F., a pebble temperature of 2250° F., twice the steam rate required for reaction (1), a reaction time of 0.7 seconds, and producing 20,000 ft.³/hr. of dry gas the following results are obtained:

1. Composition of effluent gas, mol percent, dry basis

| | |
|---|---|
| $H_2$ | 55.3 |
| $CH_4$ | 18.2 |
| $C_2H_4$ | 3.2 |
| $C_2H_2$ | 0.8 |
| $C_3H_6$ | 0.3 |
| $C_3H_8$ | 2.3 |
| CO | 17.4 |
| $CO_2$ | 2.5 |
| Total | 100.0 |

2. Mol wt. of dry gas _____ 12.2
3. Specific gravity of dry gas _____ 0.42
4. Gross heating value of dry gas, B. t. u./ft.³ _____ 540.
5. $\dfrac{\text{Volume dry gas}}{\text{Volume propane feed}}$ _____ 4.62
6. Propane required, mols/hr _____ 11.4
7. Steam required, mols/hr _____ 20.9

It can readily be interpreted from the above data that cracking propane at high temperatures in pebble heater type apparatus according to this invention is a convenient, efficient, and economical method of producing a domestic fuel gas from propane.

While the process of the invention is restricted to thermal cracking of hydrocarbons in the absence of any substantial catalytic influence to aid the cracking process, it is desirable to use pebbles impregnated with a catalyst which aids the water gas reaction when cracking in the presence of steam. The preformed pebbles may be impregnated with any of the well known water gas reaction catalysts by any of the conventional means or the catalytic material may be incorporated in the pebbles at the time of forming them. A convenient method is to spray or dip the preformed pebbles in a solution of potassium carbonate, dry and convert the carbonate to the oxide.

For a more complete understanding of the invention, reference may be had to the accompanying drawing which is a diagrammatic showing of a preferred arrangement of apparatus in which the invention of this application may be carried out efficiently. In this drawing, 1 is a pebble heater comprising a metal shell lined with a suitable refractory material which will withstand temperatures up to 3000° F. Numeral 2 represents a cracking chamber which may be constructed of materials similar to pebble heater 1 and in communication therewith thru the neck or throat 3. In operation refractory pebbles 4 are heated in pebble heater 1 by combustion of propane or similar fuel in furnace 5, which fuel is fed into mixer 6 thru line 7 and valve 8 where it is thoroughly mixed with air fed in thru line 9 from an air compressor not shown. The temperature of gas entering heater 1 thru perforate conical bottom 10 can be controlled by the rate of combustion in furnace 5 to produce pebble temperatures up to the fusion point of the pebbles if desired. The entering gas temperature preferred is approximately 2700° F. but of course may be varied up or down depending upon the other conditions of operation.

Pebbles used in the process may be made of any ceramic or other refractory material which is substantially inert and non-catalytic with respect to the cracking process and will withstand the pebble temperatures to be used. Pebbles which will stand temperatures as high as 3000° F. are in use. Such materials as alumina, beryllia, "Carborundum," mullite, periclase, and zirconia when relatively pure and bonded with a small amount of a non-deleterious bonding agent make excellent pebbles for pebble heater operation. The size of the pebbles may range from about ⅛" to about 1" in diameter, are preferably ¼" or ⅜", and are desirably spherical for good flow characteristics. The smaller sizes show less breakage and spalling, better flow characteristics, and smoother operation.

Where used throughout the specification and claims the term "pebble" is understood to include any refractory material of the nature disclosed above, which has flow characteristics suitable for use in pebble heater type apparatus.

In the process of the invention, hot pebbles are allowed to flow into cracking chamber 2 thru connecting throat 3 to furnish sensible heat and heat of reaction required by the propane being cracked in chamber 2. The flow of pebbles thru the system is controlled by the pebble feeder 12 so as to maintain the desired temperature in the cracking zone. Pebble feeder 12 receives cooled pebbles from reactor 2 via conduit 11 and feeds them via conduit 13 to bucket (or other type) elevator 14 which returns the cooled pebbles to the pebble heater 1 via the chute 15 and conduit 16. In the preferred procedure pebbles are cooled from about 2250° F. to about 600° F. as they pass thru the cracking chamber but this differential may be varied to meet the demands of the process under varied operating conditions.

Propane feed is forced into the system thru line 17 from a storage tank not shown and is heated by indirect heat exchange in heater 18 which is provided with a steam coil 19. Steam is supplied thru line 20 and valve 21 from any desirable source such as steam drum 45 which will be referred to more specifically hereinafter. Water from steam coil 19 escapes thru line 60 and trap 61. Heated propane leaving heater 18 is fed via line 22 and valves 23 and 24 into cracking chamber 2 along with steam which is fed into line 22 from line 25 controlled by valve 26. The amount of steam fed into line 22 is adjusted in accordance with the propane feed rate and the character of product gas desired.

In cracking chamber 2 propane is cracked to lighter gases and carbon formed is converted to CO and $CO_2$ by the water gas reaction. The product gases are taken off thru line 27 at a high temperature such as 2000° F. and are quenched by water sprayed into line 27 from line 28 thru a multiplicity of feeders 29 and 30, being cooled to around 1300° F. This cooled product gas is conducted thru waste heat exchanger 31 via line 27 where it is further lowered in temperature to around 500° by indirect heat exchange with water and steam from steam drum 45, circulated thru lines 58 and 59. The cooled product gas is now passed thru quench pipe 33 via line 32 where it is detarred and further reduced in temperature to about 250° F. by water admitted thru line 34 and valve 35. Line 34 connects with line 28 which carries water condensed from the product gas and returned from condensate accumulator 40. Any tar extracted is removed thru line 36. Detarred gas at a temperature of about 250° F. leaves quench pipe 33 thru line 37 and passes thru condenser 38 where steam present is liquified and passes thru line 39, along with the product gas, to condensate accumulator 40. Product gas leaves the accumulator 40 thru line 62 and may be further treated or stored for use.

Water condensed from the product gas and accumulated in 40 is fed back into the system thru lines 28 and 34. The level of water in the accumulator 40 is maintained fairly constant by liquid-level-controller 41 which operates valve 42 in line 43 to remove surplus water from the system. Pressure in line 28 and auxiliary lines is maintained by pump 44.

Waste heat exchanger 31 utilizes sensible heat from product gas to maintain steam in steam drum 45. This steam is cycled thru the system via line 25 to supply steam for the water gas reaction and line 20 for vaporizing propane feed in heater 18. Steam is also drawn off line 25 thru line 46 and valves 47 and 48 which are operated by recording flow controller 49 and recording pressure controller 50, respectively, and is utilized to maintain sufficient pressure in the neck 3 and in the pebble outlet in cracking chamber 2 to prevent substantial leakage of gases thru neck 3 and out thru pebble exit line 11. Water is fed into the steam drum 45 thru line 55 from any convenient source. Valve 57 is pressure operated to release steam from the system as required to maintain the desired steam pressure in the system.

The cracking process of this invention operates most advantageously at approximately atmospheric pressure, or slightly above, such as 16 to 18 p. s. i. g., although higher pressures may be used less advantageously. The pressure in the pebble heater 1 is desirably maintained very slightly higher than the pressure in cracking chamber 2 in order to aid in preventing leakage of product gases into the pebble heater. Any slight leakage of steam or combustion gas into cracking chamber 2 will not be detrimental to the product gases. To facilitate the maintenance of desirable pressures in chambers 1 and 2, differential pressure damper controller 51 is utilized to operate a flow damper in exhaust stack 52 in response to changes in pressures recorded at 53 and 54 at either end of the neck 3.

All valve control means may be operated manually or automatically as desired.

Numerous modifications and adaptations of the foregoing procedure may be made. While feed gas preferably flows countercurrently to the flow of pebbles, it may also be made to flow concurrently therewith. In the operation of the process, it will be necessary to remove fines and broken pebbles from the system. This may conveniently be accomplished with proper screening devices installed in pebble feeder 12 or in conduit 13. Pebbles may be removed from the system as required and only a part of the pebbles need be recycled, new or regenerated pebbles being added to maintain the required volume of pebbles in the system.

I claim:

1. A continuous process for cracking hydrocarbon gases comprising principally propane to produce a fuel gas having a heating value in the range of 500 to 700 B. t. u. per cubic foot wherein heat for the reaction is supplied by a stream of hot pebbles, which comprises gravitating hot pebbles in a vertically and laterally continuous compact bed through a cracking zone at a temperature and rate sufficient to maintain a temperature within said cracking zone within the range of 1650 to 2200° F.; simultaneously feeding said hydrocarbon gases comprising principally propane and steam in which the molar ratio of steam to propane is about 2, into said cracking zone at a pressure between atmospheric and 18 p. s. i. g. and maintaining a reaction time of about 0.7 second so that a substantial portion of free carbon resulting from the cracking reaction is removed in combined form with the product gases so as to produce a fuel gas having a specific gravity in the range of 0.35 to 0.5, containing more than 50 volume per cent of $H_2$ on a dry basis, and having a heating value in said range; removing pebbles from the cracking zone; feeding at least a portion of said pebbles to a pebble heating zone; and recycling resulting hot pebbles to said cracking zone to repeat the cycle of operation.

2. The process of claim 1 in which the temperature within the cracking zone is maintained within the range of 1900°–2100° F.

3. The process of claim 1 further characterized in that the feed rate of propane and the ratio of propane to steam are predetermined to produce a product gas having a B. t. u. value per cubic foot of about 540.

4. The process of claim 1 further characterized in that the pebbles employed contain a water-gas reaction catalyst.

5. A continuous process for cracking hydrocarbon gas comprising principally propane to produce a fuel gas of city gas specification, which comprises continuously gravitating a laterally and vertically continuous compact mass of hot pebbles through a series of superposed zones including in descending order an unobstructed cylindrical pebble heating zone, a relatively narrow elongated unobstructed cylindrical connecting zone, and an unobstructed cylindrical cracking zone; continuously contacting that section of said mass of pebbles in said pebble heating zone with hot combustion gas so as to heat the pebbles therein to a temperature above a predetermined cracking temperature within the range of 1650 to 2200° F.; continuously contacting that section of said mass of pebbles in said cracking zone at a pressure between atmospheric and 18 p. s. i. g. and a reaction time of about 0.7 second with a feed gas comprising principally propane and steam in which the molar ratio of steam to propane is about 2 so as to heat said feed gas to a temperature in aforesaid range and crack said propane thereby producing a fuel gas having a heating value in the range of 500 to 700 B. t. u. per cubic foot and a specific gravity in the range of 0.35 to 0.5, and containing more than 50 volume per cent of $H_2$ on a dry basis.

6. The process of claim 5 further characterized in that the pebbles employed contain a water-gas reaction catalyst.

LYLE W. POLLOCK.

REFERENCES CITED

The following references are of record in the file of this patent:

UNITED STATES PATENTS

| Number | Name | Date |
|---|---|---|
| 1,841,201 | Odell | Jan. 12, 1932 |
| 1,948,085 | White et al. | Feb. 20, 1934 |
| 2,071,286 | Johnson et al. | Feb. 16, 1937 |
| 2,389,636 | Ramseyer | Nov. 27, 1945 |
| 2,398,954 | Odell | Apr. 23, 1946 |
| 2,405,395 | Bahlke et al. | Aug. 6, 1946 |